April 4, 1967 P. G. RIDINGER 3,312,942

MAGNETICALLY CONTROLLED SWITCHING CIRCUITS

Filed Dec. 27, 1962 2 Sheets-Sheet 1

INVENTOR
P. G. RIDINGER
BY
S E Hollander
ATTORNEY

April 4, 1967 P. G. RIDINGER 3,312,942

MAGNETICALLY CONTROLLED SWITCHING CIRCUITS

Filed Dec. 27, 1962 2 Sheets-Sheet 2

3,312,942
Patented Apr. 4, 1967

3,312,942

MAGNETICALLY CONTROLLED SWITCHING CIRCUITS

Philip G. Ridinger, Colts Neck, N.J., assignor to Bell Telephone Laboratories, Incorporated, New York, N.Y., a corporation of New York Filed Dec. 27, 1962, Ser. No. 247,757
32 Claims. (Cl. 340—168)

This invention relates to sequential magnetic circuits and, more particularly, to such circuits employing ferreeds.

With the advent of increased speed and operational requirements in modern communications systems, devices and circuits have had to be developed to meet such contemporary needs. Although such new equipment usually involves inherently higher speed and more efficient operation, a certain degree of compatibility with present equipment is economically necessary. Such new equipment, although sufficiently fast, is ideally not thereby incompatible with the vast and yet slower operating older switching systems still in wide use. For example, telephone systems whose basic switching element is the relay should advantageously be compatible with new installations which may employ higher speed electronic elements.

A switching device which satisfied these basic needs was the ferreed, as originally described in the Bell System Technical Journal, January 1960, pp. 1 to 30, and disclosed in Feiner-Lovell-Lowry-Ridinger Patent 2,995,637, issued Aug. 8, 1961. The ferreed, in addition to requiring no holding power for its stable states, provided a reconciliation of high speed functioning and mechanical operation in its remanently magnetic members and its reed switches respectively. The ferreed as disclosed in the patent cited supra receives pulses to change the magnetic state of its remanent portion, the reed switches operating in response thereto a short time thereafter. For example, the pulsing of the device is effective to change the magnetic state of the remanent magnetic material thereof in the order of microseconds, whereas the reed operation controlled by such changes in magnetic state occurs in the order of fractional milliseconds; more specifically, the description of the ferreed in the Bell System Technical Journal cited supra gives as illustrative response times of the reed switches, 450 microseconds (.45 millisecond) for reed closure and 20 microseconds for reed release. While these "delayed" reed response times were recognized in the past, prior art circuits merely sought to avoid their ostensible handicaps. Additional complexities were thus often included in such prior art arrangements.

Heretofore, the ferreed has been utilized as a crosspoint device, as in T. N. Lowry, Patent 3,073,085, issued May 29, 1962. While wholly satisfactory in this and other prior art arrangements, the ferreed was thereby restricted in its applications. The delay between the establishment of magnetic states and the reed contact operation in response thereto was in part regarded as necessary in achieving compatibility between electronic and electromechanical structures.

In connection herewith, the use of binary cells for a multiplicity of applications in the prior switching art is well known. Perhaps the most usual such application is for pulse counting, although several other functions are often similarly satisfied. The use of such cells is essential in data processing systems, various complex communications switching arrangements and in a wide variety of related applications.

Due to inherently complex circuitry in many such prior art cells, difficulties were encountered when more demanding speed and reliability criteria were established.

For example, although magnetic cores are in themselves relatively simple devices when used individually or in arrays, their attendant readout circuitry is often quite extensive and subject to severe restrictions when nondestructive readout is desired. Moreover, the current capacity of these and other prior art devices is also often quite limited, thus further restricting the possible uses thereof.

Attendant upon such more complex readout circuitry is the problem of erroneous outputs, possibly reducing the accuracy of counting sequences. As a corollary to this problem certain prior art arrangements were susceptible to false setting of their switching stages due to improper steering, and spurious signals on their input conductors between genuine pulse signals.

Where such cells are cascaded, as in counting and similar systems, successive input signals often need to be recorded or to have their presence otherwise noticed; such input signals may be a train of pulses as in the digital representation of a telephone subscriber's number.

The usual binary cell operation is based upon having two complementary switching elements within a cell or a stage of a cascaded array. Attendant on such standard operation is the requirement for intracell signaling whereby one element of the cell is initially switched, thereby providing a signal to the other element of the cell indicative of such change and thereafter causing such element to change its own state. When such cells are cascaded, proper operation calls for, in addition to intracell signaling, similar interstage signaling.

The necessity for such signals often thereby complicated the interconnections in prior art binary cells and counters, ring counters and shift registers. Although the additional circuitry seemed to "solve" the difficulty, the apparent solutions were often economically undesirable; moreover, other electronic problems such as crosstalk became increasingly prevalent. Regarding interstage signaling, attempted prior art solutions included steering and gating arrangements usually external to the basic switching device. While superficially satisfactory, the inclusion of such arrangements tended to complicate the circuits in an awkward and cumbersome manner.

Although it had been recognized that mechanical contacts, such as those associated with relays, might relieve the situation, the resultant dependence on the relatively slow-acting relays and their lack of efficient memory capability proved to be limitations on their usefulness in these applications.

It is therefore an object of this invention to provide an improved binary cell.

It is a further object of this invention to provide improved sequential circuits utilizing ferreeds.

It is another object of this invention to advantageously utilize the delay in operation of a ferreed's reed switches in response to changes in state of its ferrite members to provide sequential switching operation.

Another object of this invention is the provision of sequential circuits whose operation is not dependent upon interstage triggering signals or separate triggering signals.

It is an additional object of this invention to provide rapid control times and reliable contact gating in sequential circuit arrangements.

Yet another object of this invention is to provide sequential switching arrangements utilizing relatively high speed elements which are yet compatible with existing electromechanical circuitry.

Another object of this invention is to provide sequential circuits whose individual stages have low power requirements.

A further object of this invention is to prevent erroneous switching of bistable stages by spurious signals occurring intermediate genuine pulses.

One illustrative embodiment of the principles of the instant invention as applied to a binary cell employs a parallel ferreed with two remanent magnetic members providing the stable magnetic states for the device. Two magnetically soft reed switches, as disclosed in the ferreed patent cited supra, are arranged to operate or release in response to changes in the magnetic state of one of the two ferrite legs; a winding on the other ferrite leg is only excited unidirectionally, thereby permanently magnetizing that leg in one direction. One of the reed switches is utilized for steering input pulses, while the other provides an external indication of the state of the binary cell. After the steering reed switch or contact has closed, a subsequent input pulse is gated therethrough to the ferreed's windings so as to establish a "release" magnetic condition; the reeds shortly thereafter release. The electrical path which provided the "release" condition, described immediately supra, is thereby opened and the arrival of the next input pulse serves to commence the switching cycle anew.

While this and other embodiments disclosed herein employ parallel ferreeds in which the remanent material may be of ferrite, it is to be understood that in other embodiments within the spirit and scope of this invention, other types of ferreeds could be utilized with remanent material of suitable metals, as is known in the art.

It should be noted that the gating or steering of pulses to the windings on the ferrite legs of the ferreed is provided through reed switches which are still closed ("unreleased") in response to the priorly established magnetic state. Thus, a closed reed switch may be arranged to steer an input pulse to windings which, when excited, will establish a "release" magnetic state in the ferrite; however, due to the time disparity between the establishment of such a state and the operation of the reed switches in response thereto, proper pulse gating is achieved. Although this "delayed" operation of the reed switches had been recognized (see, for example, the time "delay" values given in the Bell System Technical Journal, cited supra) in the past, certain prior art arrangements failed to exploit this delay as a factor in sequential circuit operation.

When binary cells are arranged in cascaded arrays, it is often desirable and indeed quite necessary that any counting process be continuous. I achieve this result in another illustrative embodiment of the instant invention wherein a ring counter employing a cascaded array of parallel ferreeds is disclosed. Input pulses to a stage of the counter are gated through one of the reed switches of that stage which acts as a steering commutator to the reset winding of that same stage and concurrently to the set winding of the following stage. Such a characteristic pulse serves to reset the first-mentioned stage, thereby subsequently releasing its responsive reed switches and concurrently breaking the steering path delineated supra. In addition, the following stage's responsive reed switches shortly thereafter operate, thereby establishing a completed electrical path for the next input pulse. The "set" condition is thereby propagated along or through the array, the numerical designation of the single set stage being indicative of the number of pulses received to that instant. Such indications are provided by utilizing the other reed switch of each ferreed stage as an isolated output indicating device. Finally, in order to provide the desirable continuous ring-type of operation mentioned supra, the electrical path through the reset winding of the last or Nth stage of the ring counter is serially connected to the set winding of the first stage of the counter. Uninterrupted continuous pulse counting is thereby assured as will be discussed in detail infra.

A feature of this invention is a binary cell using only a single ferreed.

Another feature of this invention is switching means in the cell for selectively gating input pulses to change the states of the cell and for providing isolated external indications of these states.

An additional feature of this invention is sequential circuits utilizing ferreeds whereby the three requisites of memory, logic and delay are respectively provided by the magnetic remanence of the magnetic material, by the configuration of the responsive reed switches, the windings and interconnections, and by the delay in operation of such switches after the establishment of the controlling magnetic states in the remanent magnetic material.

A further feature of this invention is a binary counter wherein information can be stored without consuming power.

Still another feature of this invention is a cascaded ferreed counter with facilities for providing uninterrupted pulse counting.

An additional feature of this invention is such a counter including facilities to eliminate the necessity for independent triggering signals between stages.

Yet another feature of this invention includes arrangements for electrically isolating switching stages to provide a safety interval intermediate genuine input signals, during which spurious signals will not erroneously affect the stages.

Further objects and features of this invention will become apparent upon consideration of the following description and of the appended claims taken in conjunction with the drawing wherein:

Figures 1, 2:
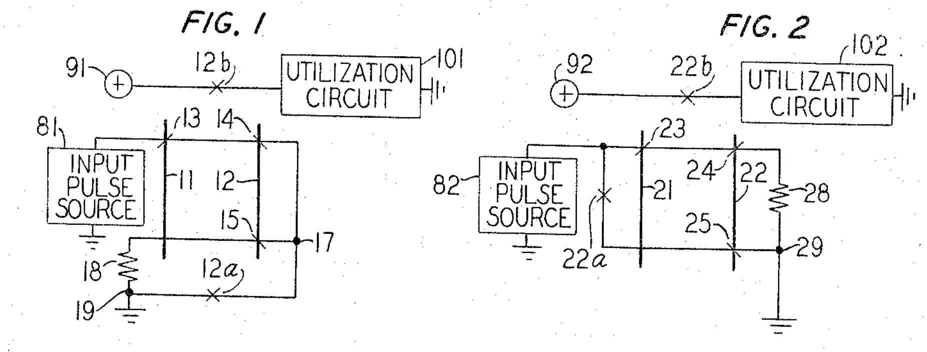
FIG. 1 is one embodiment of a single-rail ferreed binary cell in accordance with my invention.
FIG. 2 is another embodiment of a ferreed binary cell.

Referring initially to FIG. 1, a single-rail ferreed binary cell, utilizing one parallel ferreed such as that disclosed in the Feiner-Lovell-Lowry-Ridinger patent cited supra, is disclosed. The ferreed shown therein is symbolized in accordance with the conventional "mirror symbols" described, for example, in the article "Pulse Switching Circuits Using Magnetic Cores," by M. Karnaugh, in vol. 43 of the May 1955 Proceedings of the IRE, at p. 572. Briefly, such symbology shows magnetic cores or in the case of ferreeds, the magnetically remanent ferrite legs, represented by the relatively heavily drawn vertical lines; electrical conductors are represented by the more lightly drawn lines in each drawing, and windings are represented by symbolic "mirrors" drawn at a 45 degree angle to the heavy vertical lines at the appropriate "intersections" of the conductors and the ferrite. The magnetic field sense or orientation (magnetization direction) is determined by "reflecting" the current which produces the field in the winding mirror symbol. For example, referring to FIG. 1, when current passes from left to right through symbolic winding 13 associated with ferrite leg 11, such reflection indicates that the magnetic field direction thereby produced in connection with ferrite leg 11 is in an upward sense. Similarly, current passing from left to right through winding 14 on ferrite leg 12 of FIG. 1 produces a downward magnetization direction in accordance with such reflection principles. The "mirror symbols" cited supra will be referred to throughout the specification and the principles above discussed are similarly applicable in the other figures of the drawing.

The magnetically soft reed switches which operate or release in response to changes in the magnetic state of the switching ferrite legs are designated as detached contacts 12a and 12b in FIG. 1. The designation 12, used initially with respect to the right-hand ferrite leg of the ferreed shown in FIG. 1, is associated with contacts 12a and 12b since ferrite leg 12 is the switching leg of the ferreed therein shown. That is, since pulse current is constrained to pass through winding 13 on ferrite leg 11 in only a single direction, the magnetic field thereby created with respect to said leg 11 is permanently maintained in the upward direction. However, as will be described in detail infra, the magnetic field direction associated with ferrite leg 12 alternately switches between the upward and downward directions. According to the principles of the Feiner et al. patent cited supra, the responsive reed switches, represented in FIG. 1 by contacts 12a and 12b, will only operate when the magnetic fields in ferrite legs 11 and 12 are both upwardly directed or both downwardly directed; thus, since the magnetic field associated with ferrite leg 11 has been shown supra to be permanently in the upward direction, contacts 12a and 12b will only operate to close their respective electrical paths when the magnetic field direction associated with ferrite leg 12 and caused by the excitation of windings 14 and 15 is similarly in the upward direction. When, on the other hand, the magnetic field direction associated with ferrite leg 12 is switched to the downward direction, the reed switches represented by contacts 12a and 12b respond thereto by releasing or opening their respective electrical paths.

As a matter of convention, when the ferreed binary cell of FIG. 1 has its contacts 12a and 12b open, such a condition will be donominated herein as the "reset" state; similarly when the contacts 12a and 12b are closed or operated, such a condition will be called the "set" state. In conjunction with these configurational labels, winding 14 of FIG. 1, the passage of current through which causes a downward magnetic direction in ferrite leg 12 and thereby results in the releasing of priorly operated contacts 12a and 12b, is called the reset winding. Furthermore, when input pulse current passes through winding 15, an upward magnetic direction is created in remanent ferrite leg 12, thereby tending to close contacts 12a and 12b; winding 15 is thereby denominated the set winding. Finally, it will be noted that in order for the ferreed binary cell of FIG. 1 to be set, current must pass not only through set winding 15, but also through reset winding 14. It is therefore necessary that set winding 15 have a greater number of turns than reset winding 14 in order to properly control the direction of the magnetic field produced with respect to ferrite leg 12 when the binary cell of FIG. 1 is to be set. This method will sometimes be referred to hereinafter as differential excitation.

A complete switching cycle of the binary cell shown in FIG. 1 will now be described under the assumption that the cell is initially in the reset state—that is, under these conditions, contacts 12a and 12b are released or open.

*Switching cycle of binary cell (FIG. 1)*.—With the cell in such a reset condition, the next pulse from input pulse source 81 will pass to ground at terminal 19 over a path which includes winding 13 on ferrite leg 11, reset winding 14 on leg 12, terminal 17, controlling set winding 15, and resistance element 18. As mentioned supra, the upwardly directed magnetic field produced by the excitation of winding 13 has no effect other than to maintain the magnetization direction associated with ferrite leg 11 precisely in the same direction as it was prior to such pulse excitation. It may be noted that if pulses of a single polarity are uniformly provided with source 81, winding 13 may be omitted if leg 11 is permanently magnetized in the proper direction (e.g., upward for positive pulses). Conversely, the inclusion of winding 13 permits the cell of FIG. 1 to be properly responsive to pulses of either polarity in any order, as long as leg 11 comprises remanent material. As regards the windings on leg 12 of the ferreed binary cell of FIG. 1, such an input pulse passing through winding 14 creates a downwardly directed magnetic field, while the passage of the same pulse from right to left through set winding 15 produces a stronger magnetic field in the upward direction than that resulting from the excitation of reset winding 14. Due to this differential excitation, the cumulative magnetization effect produced with respect to ferrite leg 12 is an upwardly directed one. In accordance with the operation of the ferreed in the patent cited supra, and as applicable to the instant invention as shown in FIG. 1, a "closure" magnetization effect is thereby produced which, after a short delay causes the contacts 12a and 12b to operate or close in response thereto.

The contact 12b is connected to an output indication circuit whereby the contact's closure provides a completed electrical path between output potential source 91 and utilization circuit 101. From this output arrangement it can be seen that utilization circuit 101 will only receive output signals from source 91 when contact 12b is closed. Therefore, utilization circuit 101 can identify the set state of the binary cell of FIG. 1 by the presence of electrical signals flowing thereto from potential source 91; it is readily apparent that the utilization circuit can be arranged in a well-known manner to be responsive also, or alternatively, to the absence of any electrical indication from potential source 91, such an absence being indicative of the reset state of the cell (when contact 12b is open).

With the binary cell of FIG. 1 thereby actuated into the set state, utilization circuit 101 having been "informed" thereof as delineated supra, it is now assumed that the next or second pulse arrives from input pulse source 81. Since contact 12a is closed when the ferreed binary cell of FIG. 1 is in the set state, this second input pulse proceeds to ground at terminal 19 over a path which includes winding 13 on ferrite leg 11, reset winding 14 on leg 12, junction point 17, and through closed make contact 12a. It is thus noted that set winding 15 is thereby bypassed under these circumstances, since the input pulses passes directly from terminal 17 to grounded terminal 19 through closed contact 12a. Protective resistor 18 is included in the circuit to avoid placing a "dead short" across set winding 15 when contact 12a closes. The magnetization direction produced by the excitation of winding 13 is identical to that described supra. However, since set winding 15 has been essentially bypassed with only a small current having passed through its coils by virtue of inductive coupling between windings 14 and 15 the excitation of reset winding 14 controls the magnetic field direction produced with respect to ferrite leg 12. Since this thusly produced magnetic direction is downward in sense in accordance with the mirror symbols stipulated supra, the interaction of the upwardly directed field permanently associated with ferrite leg 11 and the downwardly directed field associated with ferrite leg 12 results in a "release" condition for the reed switches of the binary cell of FIG. 1.

As a result of the production of such a condition, the contacts 12a and 12b release or open almost immediately thereafter, thereby returning the ferreed binary cell of FIG. 1 to the condition initially assumed supra; that is, the cell is now again in the reset state and the switching cycle caused by the receipt of every two pulses from input pulse source 81 is completed. As described supra, the utilization circuit 101 may be straightforwardly arranged to be responsive to the reset state of the binary cell by having the circuit respond to the absence of any electrical signal from source 91 when contact 12b is open (the reset state).

A modified version of a ferreed binary cell is shown in FIG. 2. Generally similar in nature to the ferreed binary cell shown in FIG. 1, the cell of FIG. 2 has windings 23 and 25 arranged as are windings 13 and 15 respectively of FIG. 1; however, it will be noted that winding 24 is wound oppositely from winding 14 and in accordance with the mirror symbology utilized herein, winding 24 is seen to be the set winding, whereas winding 25 is the reset winding. Contact 22*a*, which is responsive to changes in state of the switching ferrite leg 22 of FIG. 2, is shown shunting windings 23 and 24 and in order to avoid short-circuiting these windings when the contact 22*a* is closed (the set state), protective resistor 28 is included in series with windings 23 and 24.

*Switching cycle of binary cell* (*FIG. 2*).—Assuming that the cell of FIG. 2 is initially in the reset state with contacts 22*a* and 22*b* unoperated, the first pulse from input pulse source 82 will pass to ground at terminal 29 over a path which includes winding 23 on ferrite leg 21, set winding 24 on ferrite leg 22 and resistor 28. As was the case with winding 13 in FIG. 1, a permanent upward magnetization direction is established with relation to the left-hand ferrite leg of the ferreed of FIG. 2, that is, leg 21. A similar upward magnetic field is created by the passage of this first pulse from left to right through winding 24 of FIG. 2. Since contact 22*a* is still unoperated, no pulse current passes through reset winding 25. Therefore, the magnetic fields thereby created are both in the upward direction and this causes responsive reed switches 22*a* and 22*b* to operate or close shortly after the establishment of the upward magnetic fields. The binary cell of FIG. 2 is now in the set state.

The electrical path to ground for the next or second input pulse from source 82 is effectively through closed contact 22*a* and thence through reset winding 25 to grounded terminal 29. However, due to the possibility of some leakage flow through windings 23, 24, and through resistor 28 to grounded terminal 29, the controlling effect of winding 25 is insured by providing winding 25 with a greater number of turns than winding 24. Such differential excitation will guarantee the resetting of the binary cell of FIG. 2 on the second input pulse. With this arrangement, the downward magnetization direction provided by the excitation of reset winding 25 will switch the magnetization of ferrite leg 22, and in conjunction with the upward magnetic field direction in ferrite leg 21, responsive contacts 22*a* and 22*b* will shortly thereafter release in response thereto. When contacts 22*a* and 22*b* thereby open, the ferreed binary cell of FIG. 2 has now been returned to the reset state in which the switching cycle commenced under the initial assumptions supra.

The external output indications provided to utilization circuit 102 through the interaction of output potential source 92 and output contact 22*b* are precisely the same as those described with relation to the binary cell of FIG. 1. That is, when the cell is in the reset state with contact 22*b* open, no signal is provided from source 92 to utilization circuit 102. Similarly, after contact 22*b* operates, a circuit is closed between the source 92 and the utilization circuit 102 to provide the utilization circuit with an indication that the binary cell of FIG. 2 has been set.

Figure 3:
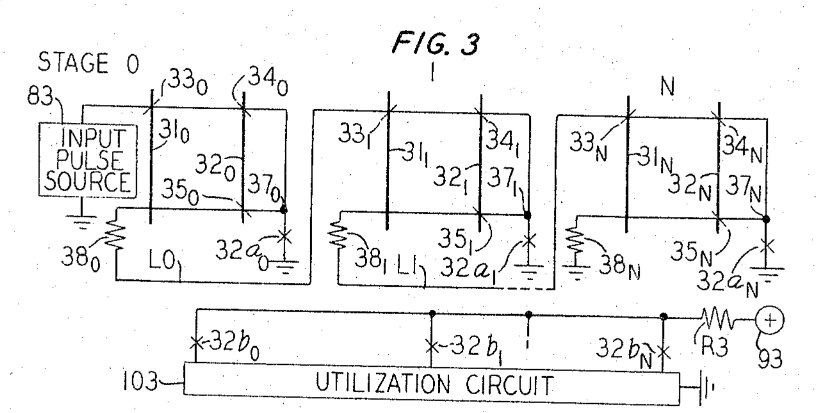
FIG. 3 is a series-connected ferreed binary counter of N stages, utilizing a ferreed binary cell similar to that of FIG. 1.

The series-connected ferreed binary counter of FIG. 3 indicates a cascaded array of N stages, each stage being generally similar to the binary cell of FIG. 1. The counting cycle of this counter will be discussed as though only three stages were present, but it is evident that the labeling of the last stage as the Nth stage presumes the cascading of an unlimited number of such cells. Each stage is coupled to the next stage by a resistor, such as resistor $38_0$ in stage 0 and $38_1$ in stage 1; these resistors also serve to eliminate the possibility of any erroneous pulsing between stages when a given stage is being reset and when no pulse transmission to the succeeding stage is desired. Since the utilization circuit 103 can be made responsive in a well-known manner as mentioned supra to either the presence or the absence of an electrical signal from output source 93 through resistor R3, it will be assumed, merely for the purposes of this description, that said utilization circuit in fact responds to the open condition of the output contact in each stage. This is to enable utilization circuit 103 to "count up"; if the utilization circuit were made responsive to the closure condition of the output contacts $32b_0$–$32b_N$, the circuit would actually "count down" and to facilitate the description, the former selection is being made herein.

In a binary counter wherein each stage is capable of summing two distinct stable states, as is the ferreed, each such stage represents an exponential power of the base 2. The number of pulses counted at any given instant can be determined (by the utilization circuit 103; for example) by summing the numerical designations of the reset stages individually raised from the base 2. For example, if stages 0 and 1 of the binary counter shown in FIG. 3 are the only reset stages in the counter, the utilization circuit 103 would be arranged to detect the unoperated condition of output contacts $32b_0$ and $32b_1$. If this were the case, the number of pulses thus far received by the counter can be determined by adding the values represented by the base 2 raised to the numerical power of each of the reset stages. In this example, with stages 0 and 1 reset, the pulse total would be determined by adding $$2^0+2^1=1+2=3$$

pulses received. Under the further assumption that $N=2$ (a total of 3 stages), a complete counting cycle including the eight possible combinational configurations of the output contacts of the counter shown in FIG. 3 will now be described. (The maximum count value of 7 exists when all stages are reset, the utilization circuit 103 thereby being furnished with a cumulative count represented by the sum $$2^2+2^1+2^0=4+2+1=7$$

pulses, the 8th pulse serving to set all stages and thereby return the counter to what will be assumed to be its initial condition, that is, all stages set.)

*Counting cycle for binary counter of FIG. 3.*—The counting cycle will be assumed to commence with all the stages of the counter set—that is, with contacts $32a_0$–$32a_N$ closed. Under this assumption, the first pulse from source 83 affects only stage 0 by passing over a path which includes winding $33_0$ on ferrite leg $31_0$, reset winding $34_0$ on ferrite leg $32_0$, terminal $37_0$ and to ground through closed contact $33a_0$. In accordance with the binary cell switching principles delineated supra, such pulse transmission has the effect of resetting stage 0 and thereby opening the responsive reed switches represented by contacts $32a_0$ and $32b_0$. After the passage of the first pulse just described, utilization circuit 103 no longer receives an electrical signal from output potential source 93 since contact $32b_0$ is now open; utilization circuit 103, in accordance with the convention assumed supra, thus records the receipt of 1 pulse in a counting sequence.

The second pulse from input pulse source 83 traverses an electrical path which includes winding $33_0$, winding $34_0$, terminal $37_0$, set winding $35_0$, resistor $38_0$, conductor L0, winding $33_1$ on ferrite leg $31_1$, reset winding $34_1$ on leg $32_1$, terminal $37_1$ and to ground through closed contact $32a_1$. As will be understood from ferreed switching principles, this second pulse, having passed through set winding $35_0$ of stage 0, sets stage 0, thereafter closing contacts $32a_0$ and $32b_0$; it also has the effect of resetting stage 1 and opening responsive contacts $32a_1$ and $32b_1$. Utilization circuit 103 now detects the absence of any electrical signal at the terminal which includes contact $32b_1$ which is now open, thereby registering an indication that $2^1=2$ pulses have so far arrived.

The third pulse from input pulse source 83, as do all subsequent odd-numbered pulses (5th, 7th, 9th, etc.) therefrom, only affects the state of stage 0, since such pulses pass directly to ground from the input through closed contact $32a_0$. As with the first pulse received from source 83, stage 0 is reset, contacts $32a_0$ and $32b_0$ shortly thereafter opening. Utilization circuit 103 now detects that both contacts $32b_0$ and $32b_1$ are open and that therefore, $$2^0+2^1=1+2=3$$

pulses have been counted to that instant.

The fourth pulse from input pulse source 83 is the first pulse which by the configuration of the steering contacts is able to affect the state of stage N. After having passed through the reset and set windings of stage 0 and the reset winding of stage 1, the pulse proceeds from terminal $37_1$ through set winding $35_1$, resistor $38_1$, conductor L1, winding $33_N$ on ferrite leg $31_N$, reset winding $34_N$ on leg $32_N$, and from terminal $37_N$ through grounded contact $32a_N$. It may readily be observed that this will switch stages 0 and 1 to their set conditions, closing their responsive contacts and will also have the effect of resetting stage N. If it is assumed that $N=2$, utilization circuit 103 will detect the absence of an electrical signal from output source 93 through resistor R3 only with regard to now open contact $32b_N$; the receipt of $2^N=2^2=4$ pulses is thereby registered in the utilization circuit 103.

The fifth pulse from source 83, as mentioned supra, only has the effect of resetting stage 0, thereby opening its responsive contacts $32a_0$ and $32b_0$. The output indication is therefore of a number of pulses equivalent to the sum (represented by the absence of any signals through the open output contacts)

$$2^N+2^0=2^2+2^0=4+1=5$$

pulses.

The sixth pulse from input pulse source 83, in a manner which is apparent in view of the prior steps in the counting cycle, sets stage 0, resets stage 1 and leaves stage N unaffected. Output contact $32b_0$ thereafter closes while output contact $32b_1$ similarly opens. The registration of the sixth pulse is made by the utilization circuit 103 by the detection, on the leads associated with open output contacts $32b_1$ and $32b_N$, of the representative sum $$2^1+2^N=2^1+2^2=6$$

pulses.

With stages 1 and N (under the assumption that there are no stages intermediate stage 1 and stage N—i.e., $N=2$) being reset and stage 0 being the only stage in the set state, the seventh pulse from input source 83, being an odd-numbered pulse, serves only to reset stage 0. Now, after the contacts of stage 0 have responded to the magnetic changes resulting from the excitation just described, all responsive contacts (steering contacts $32a_0$–$32a_N$ and output contacts $32b_0$–$32b_N$) are open or released. Utilization circuit 103 registers the presence of a 7-pulse chain by detecting no electrical signal at all from output source 93; such a pulse train thereby represents $2^0+2^1+2^N=7$ pulses, where $N=2$.

Under the continuing assumption that $N=2$, the eighth pulse from input pulse source 83 has the effect of returning the entire binary counter of FIG. 3 to the condition in which the counting cycle commenced: all stages set and all responsive contacts thereby closed. This occurs by the passage of this eighth pulse through the reset and set windings of both stages 0 and 1, and thence from terminals $37_N$ through set windings $35_N$ and to ground through resistor $38_N$. Thus, stage N is also set. When all the contacts have operated as described immediately supra, the counter is returned to its initial condition and is prepared to receive subsequent pulse trains.

Figure 4:
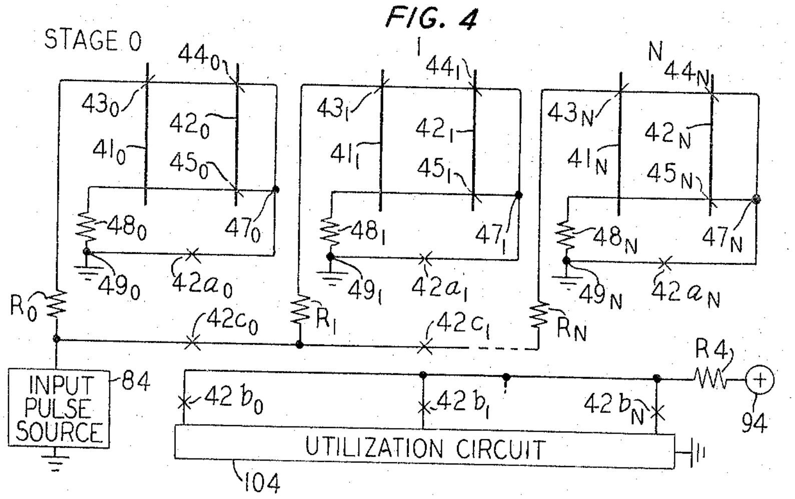
FIG. 4 is a parallel-connected ferreed binary counter of N stages utilizing the ferreed binary cell of FIG. 1.

In FIG. 4, a parallel connected single-rail ferreed binary counter of N stages is illustrated. The individual binary cell in each of the counter stages is substantially identical to the cells of the stages of FIG. 3, which in turn is based largely on the cell shown in FIG. 1. The elements of each cell of the counter in FIG. 4 have been numerically designated so as to be as consistent as possible with the designations used with respect to FIG. 3. Certain additional designations have had to be made in FIG. 4, namely the grounded terminals $49_0$–$49_N$, current dividing resistors $R_0$–$R_N$ and the additional contact per stage, only two of which are shown in FIG. 4 ($42c_0$ and $42c_1$).

The utilization circuit 104 of the FIG. 4 binary counter can be the electrical equivalent of its FIG. 3 counterpart. However, in order to facilitate the description of the invention and to illustrate another arrangement whereby such utlization circuits can be responsive to output signals, utilization circuit 104 is assumed to be responsive to register count pulses when any of the contacts $42b_0$–$42b_N$ are in the closed condition. This permits utilization circuit 104 to "count up" as did utilization circuit 103, described supra with relation to FIG. 3; it will be recalled however, that utilization circuit 103 was arbitrarily, although conventionally, made responsive to the open state of its output contacts $32b_0$–$32b_N$ in FIG. 3. As mentioned supra, such output circuits may be made responsive to either the open or the closed condition of its associated output contacts, so the selection herein made is merely an expeditious one.

*Counting cycle for binary counter of FIG. 4.*—A complete counting cycle of the counter of FIG. 4 is in large measure quite similar to that described supra with respect to the counter of FIG. 3. Due however to the propagating contacts $42c_0$ and $42c_1$, few steps in the cycle will be described. If the counter of FIG. 4 is initially assumed to be in its lowest counting state with every stage reset and all responsive contacts open, the first pulse from input pulse source 84 will pass to ground at terminal $49_0$ over a path which includes resistor $R_0$, permanent set winding $43_0$, reset winding $44_0$, terminal $47_0$, set winding $45_0$, and resistor $48_0$. This first pulse, as do all succeeding odd-numbered pulses, only has the effect of setting stage 0, thereby causing responsive contacts $42a_0$, $42b_0$ and $42c_0$ to close shortly thereafter. Since it is apparent that a pulse which sets a stage of the counter shown in FIG. 4 (such as stage 0) must pass through both the reset winding $44_0$ and also through the set winding $45_0$, the already described arrangement of differential excitation is utilized, whereby the set winding under such circumstances has a greater number of turns than does the reset winding. The next or second pulse delivered from pulse source 84 now demonstrates, by the path which it traverses, the operation of the parallel connected binary counter of FIG. 4.

Such a pulse is transmitted over parallel paths to ground at terminals $49_0$ and $49_1$, respectively. The first path includes resistor $R_0$, windings $43_0$ and $44_0$, terminal $47_0$, closed contact $42a_0$ to grounded terminal $49_0$. The passage of the pulse across such a path effects the resetting of stage 0 (as does each succeeding even-numbered pulse), subsequently opening its responsive contacts $42a_0$–$42c_0$. Prior to such responsive operation of the contacts of stage 0, the second parallel path traversed by the second pulse from source 84 is seen to be through closed propagating contact $42c_0$, resistor $R_1$, windings $43_1$ and $44_1$, terminal $47_1$, controlling set winding $45_1$ and to grounded terminal $49_1$ through protective resistor $48_1$. Stage 1 is thereby set in response to the second pulse from source 84, its contacts responding thereto by closing shortly thereafter. The remainder of the counting cycle proceeds identically until all stages 0–N are set, at which time all contacts are closed. The following pulse from input pulse source 84 (under the assumption that the Nth stage shown in FIG. 4 is the final stage of the counter, ie., that $N=2$) i.e., the 8th pulse, passes through only the reset windings of all stages, thereby resetting each stage and returning the counter to its initial condition.

Since the utilization circuit 104 has been said to be responsive in this particular case to the closure stages of output contacts $42b_0$–$42b_N$ (that is, when the corresponding stages are set), one such illustrative read-out process will be described. For instance, after three pulses have been transmitted to the counter of FIG. 4 and have been recorded threin, it will be seen that stages 0 and 1 set, while stage N of FIG. 4 remains reset. Therefore, with contacts 42$b_0$, and 42$b_1$ being the only closed output contacts, utilization circuit 104 is arranged in a well-known manner to sense the presence or flow of current from output potential source 94 through resistor R4 and through each of the closed contacts 42$b_0$ and 42$b_1$. As with the utilization circuit 103 of FIG. 3, circuit 104 of FIG. 4 records these signals as representing the count of $$2^0+2^1=1+2=3$$

pulses. The output procedure can readily be extended to the remainder of the counting cycle.

Figure 5:
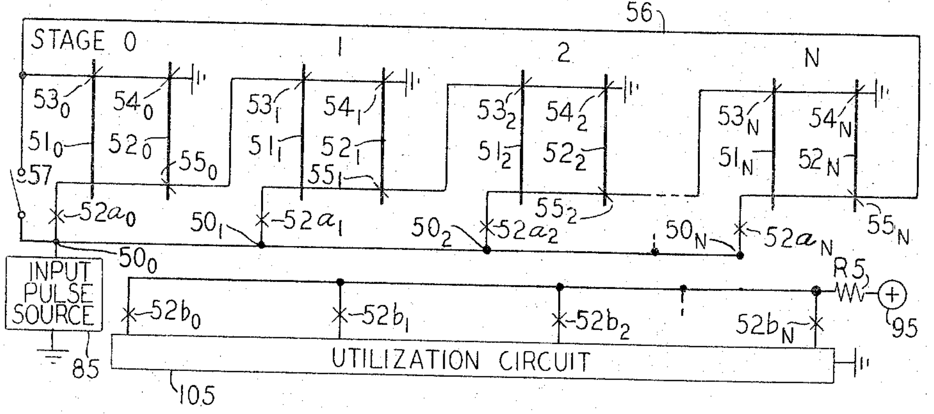
FIG. 5 is an N stage ferreed ring counter.

Referring now to FIG. 5, a single-rail ferreed ring counter of N stages is disclosed. Once again, the elements of each of the stages of FIG. 5 have been numbered in accordance with the designations priorly used in FIGS. 1–4; the only required additions to FIG. 5 have been the terminals 50$_0$–50$_N$ used for illustrative purposes in describing the steering of input pulses from source 85 to respective ones of the stages 0–N.

The use of ring counters is well known in the art and generally involves the propagation of a fixed condition or state through a plurality of bistable stages connected in cascade. Usually there is a need for separate carry pulses from one stage to the immediately succeeding stage to inform the latter that the former has switched states and to effect the switching of the latter since the arbitrarily fixed condition which is propagated through a ring counter ordinarily cannot be permitted to exist simultaneously in more than a single stage. Knowledge of which stage in a ring counter exists in this fixed condition allows for a determination of the number of count signals recorded in the counter to that time. In order to provide a fully continuous counting chain, arrangements may be made whereby a pulse which is directed to affect the state of the last stage of the counter prepares the initial stage of the counter for a subsequent signal.

*Counting cycle for ring counter of FIG. 5*—The fixed condition which is propagated through the ring counter of FIG. 5 is now arbitrarily chosen as the set state in any one of the stages 0–N. In order to set any stage of the counter, it can be seen from FIG. 5 that a pulse is gated to the set winding on the switching leg of such a stage after having passed through the reset winding of the previous stage. For example, it if is desired to set stage 1, stage 0 must be initially in the set state with contact 52$a_0$ closed; if it is assumed that no stages are set, stage 0 may be set to initialize the counter by closing symbolic switch 57 and applying a start pulse from source 85 to ground through set windings 56$_0$ and 54$_0$. Switch 57 may now remain open during the counting sequence. The first counting pulse from input pulse source 85 passes from terminal 50$_0$ through closed contact 52$a_0$, reset winding 55$_0$ of stage 0, and through winding 53$_1$ and set winding 54$_1$ to ground in stage 1. Such pulse transmission is readily seen, in accordance with the ferreed switching principles delineated in detail supra, to reset stage 0 and to thereby set stage 1. Since such a dually effective pulse passes only through one controlling winding of a stage at a time, no differential excitation is required and all windings may advantageously be made of the same number of turns.

The arbitarily chosen fixed condition (the set state) is propagated from stage to stage in the ring counter of FIG. 5 until finally, after the receipt of the Nth pulse, stages 0–2, etc., are in the reset state while stage N is the only stage in the set state. The ring counter of FIG. 5 is recycled by serially connecting reset winding 55$_N$ of stage N with set winding 54$_0$ of stage 0. It is thus evident that when the ($N$+1) the pulse arrives from pulse source 85 at input bus terminal 50$_N$, it will be directed to ground through closed contact 52$a_N$, reset winding 55$_N$, conductor 56, and windings 53$_0$ and 54$_0$ of stage 0. This has the effect of resetting stage N, thereafter opening its responsive contacts 52$a_N$ and 52$b_N$, and also of setting stage 0 and causing the latter's responsive contacts 53$a_0$ and 52$b_0$ to thereafter close, thereby returning the counter to its initial condition.

Utilization circuit 105 of FIG. 5 receives output indications from output potential source 95 through resistor R5 and then through one of the contacts 52$b_0$–52$b_N$ which is closed. Furthermore, it will be apparent to those skilled in the art that suitable recording means may be included in utilization circuit 105 in connection with readout signals received through closed contact 52$b_N$ in order to distinguish amongst cumulative counts representing 2 pulses, $N$+2 pulses, 2$N$+2 pulses, etc.

Figure 6:
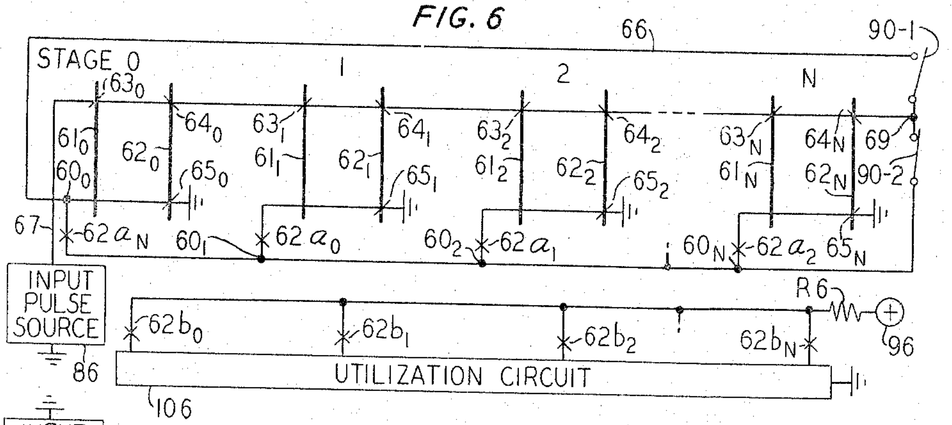
FIG. 6 is an alternate embodiment of such a ferreed ring counter.

The ferreed ring counting arrangement shown in FIG. 6 utilizes a gross reset conductor 67 which serially connects the input pulse source 86 with the reset windings of all ferreed stages. Externally controlled switches 90–1 and 90–2 are included for initializing or unconditionally setting stage 0 of the counter regardless of which stage was priorly in the set state; it will be understood that these switches are merely symbolic representations of any one of a variety of suitable switching means which may be provided both to initialize the counter and to insure continuous free running operation.

In accordance with an important feature of this invention, it will be noted from FIG. 6 that the steering contacts 62$a$ responsive to changes in magnetic state of their associated stages serve to steer pulses to the set winding of the succeeding stage. For example, contact 62$a_0$, operative in response to the setting or resetting of stage 0 (more specifically to the changes in stage of switching ferrite leg 62$_0$), serves to steer pulses which eventually arrive at terminal 60$_1$ to the set winding 65$_1$ of stage 1. Due to the time disparity betwen the relatively instantaneous changes in magnetic state associated with the ferrite legs and the relatively slower operating reed switches or contacts, such a pulse may be properly steered to the set winding of a succeeding stage even though the preceding stage to whose magnetic state changes such contact is responsive has already been magnetically switched.

Again referring to contact 62$a_0$, an illustrative pulse from source 86 may pass thereto over a path which includes reset conductor 67, windings 63$_0$–63$_N$ and reset windings 64$_0$–64$_N$ of all ferreed stages, normally closed switch 90–2, and from terminal 60$_1$ through closed contact 62$a_0$ to grounded set winding 65$_1$ of stage 1. (This example is based on the assumption that stage 0 is initially set with its responsive contacts closed, while all other stages are reset with their responsive contacts open.) It is now apparent that the passage of the set pulse through the reset winding 64$_0$ of stage 0 induces a downward magnetization direction in switching ferrite leg 62$_0$, thereby relatively instantaneously establishing stage 0 in the magnetic reset state. However, due to the finite delay before responsive contact 62$a_0$ releases in response thereto, the pulse referred to has passed through still closed contact 62$a_0$, and due to the presence of a greater number of turns on set winding 65$_1$ than on reset winding 64$_1$, the pulse has been able to magnetically set stage 1. Shortly thereafter, contact 62$a_0$ will finally release and after an additional interval has passed, the contacts 62$a_1$ and 62$b_1$ responsive to the magnetic changes of stage 1 will operate.

By way of illustration, it may be recalled that the Bell System Technical Journal article cited supra noted that typical response times for the reed switches of a ferreed were 20 microseconds for the contacts to release and 450 microseconds for the contacts to operate. From this illustrative data, it can be seen that no difficulty should arise concerning the possibility of having two stages set simultaneously; according to the time intervals cited herein, there is a substantial safety margin of approximately 430 microseconds which tends to militate against such an injurious occurrence. This safety margin may be seen to have at least two outstanding beneficial effects. Initially, since no two stages may be simultaneously set, no false states can exist in the counter of FIG. 6. (This, it is apparent, is equally applicable to the counter of FIG. 5.) A corollary of this first effect is that there can be no duplicate or overlapping output signals which might otherwise impair the accuracy of the counting sequence as received in utilization circuit 106; this is based on the operation and release of output contacts $62b_0$–$62b_N$, all of which are open during the approximate 430 microsecond safety interval. The second effect concerns steering contacts $62a_0$–$62a_N$. Since these contacts are also all released during the safety interval, there is no path to ground from input pulse source 86 during that time. Thus, any spurious signals on input bus 67 during an interpulse period will be ineffective to disturb the magnetic states of the counter.

*Initializing the ring counter of FIG. 6.*—If it is assumed that the termination of a prior counting sequence has left the ring counter of FIG. 6 with stage 1 set and therefore with contacts $62a_1$ and $62b_1$ closed, the initializing process involving normally open switch 90–1 and normally closed switch 90–2 and the beginning of another counting sequence may be demonstrated. With the counter in such a condition, the necessity for resetting any priorly set stage and for concurrently setting stage 0 is apparent. This is accomplished by operating switches 90–1 and 90–2 so as to close the former and open the latter. An initializing pulse signal then is provided from input pulse source 86 to reset conductor 67 and through the upper windings of stages 0–N to terminal 69, and thence through now closed switch 90–1 over conductor 66 to terminal $60_0$ and to ground through set winding $65_0$. Such an initializing signal cannot pass downward beyond terminal $60_0$ under the assumption made supra since the only priorly set stage was stage 1 (i.e., contact $62a_N$ is open); even if, on the other hand, stage N were assumed to be the priorly set stage whereby contact $62a_N$ would be closed, the initializing pulse would still proceed from terminal $60_0$ to ground through winding $65_0$ since no path to ground is available through assumedly closed contact $62a_N$.

Returning to the original assumption, the initializing signal, having passed through only the reset windings of stages 1–N, is effective to reset any of those stages which were priorly set, in this case stage 1; a short time thereafter, illustratively 20 microseconds as mentioned supra, the responsive contacts of stage 1 release. Both the reset winding $64_0$ and the set winding $65_0$ of stage 0 have thus been excited, and due to the differential excitation obtained by providing the set windings $65_0$–$65_N$ of all stages with a greater number of turns than the respective reset windings $64_0$–$64_N$, the cumulative magnetization is effective to set a stage thusly excited. Therefore, stage 0 is accordingly set and its responsive contacts $62a_0$ and $62b_0$ respond thereto by operating after the illustrative time interval of 450 microseconds has passed. Prior to the commencement of the counting cycle, symbolic switches 90–1 and 90–2 are returned to the normal conditions in which they are shown in FIG. 6, with the former open and the latter closed. The ring counter of FIG. 6 has now been initialized and prepared for a new sequence of counting pulses.

*Counting cycle for ring counter of FIG. 6.*—The first illustrative count pulse from input pulse source 86 is transmitted to ground over a path which includes reset conductor 67, the upper windings 63 and 64 of stages 0–N, terminal 69, closed switch 90–2, terminal $60_1$, closed contact $62a_0$ and controlling set winding $65_1$. In a manner similar to the description relating to the initializing signal, this first pulse is effective to reset stage 0 and to set stage 1, opening the contacts of the former after an illustrative delay of 20 microseconds and closing the contacts of the latter after an illustrative delay of 450 microseconds. The utilization circuit 106 is arranged to respond to signals through the appropriate closed output contact, in this particular case $62b_1$, such signals being provided thereto from output potential source 96 through output resistor R6.

The counting process proceeds as described above until stage N is the only stage in the counter which is in the set state having been set by the Nth pulse; accordingly, its responsive contacts $62a_N$ and $62b_N$ are closed. The next or $(N+1)$th pulse emanating from input source 86 can readily be seen to pass to ground through set winding $65_0$ of stage 0 over a path including contact $62a_N$. When the contacts of stage N and stage 0 have completed their operations in response to such a pulse (as supra, this period may illustratively be 450 microseconds), stage 0 is once again the only set stage in the counter and the counter is prepared to continue to receive subsequent pulses from source 86. As noted earlier with regard to FIG. 5, the utilization circuit 106 can readily and in a well-known manner be arranged to provide separate internal indications of the number of pulses that have been recorded by the Nth stage of the counter. Such provision would normally be necessary in order for the output utilization circuit 106 to maintain a cumulative record of all pulses in excess of N pulses received by the counter; with the inclusion of such an arrangement, and if the counter were found to have stage 2 set, it would be possible to determine whether the counter had priorly received $$2, N+2, 2N+2 \text{ or } kN+2$$

pulses.

Figure 7:
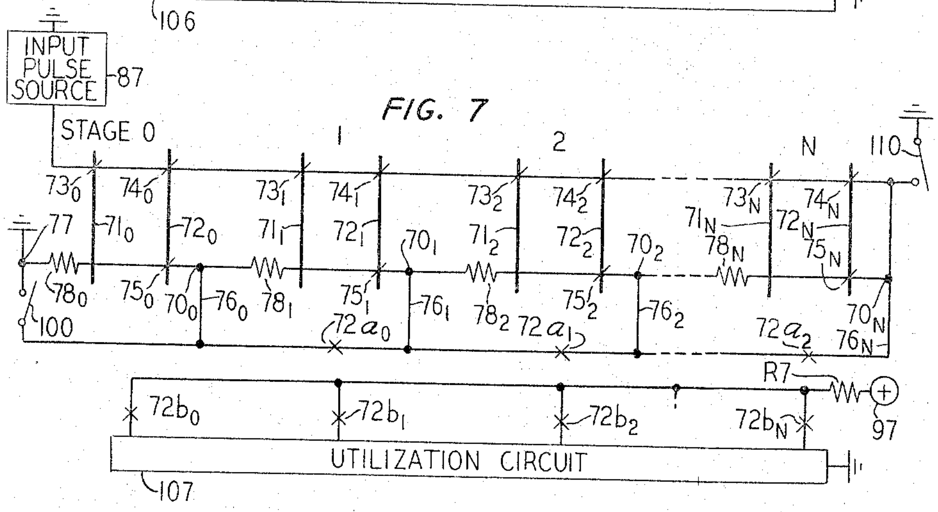
FIG. 7 is an N stage, single-rail ferreed shift register.

A ferreed shift register utilizing a cascaded array of parallel ferreed cells is shown in FIG. 7. With the advent of high speed communications and of data processing systems, the use of shift registers has become prevalent throughout the electronics industry. In the area of information handling systems, shift registers are often used to store data, to count representative signals and to convert such data from a series to parallel mode or vice versa. It is of course desirable that the shifting process be done at high speeds and that the storage of information be accomplished with a minimum of power consumption. Furthermore, such steering data should often be available without disturbing the state of the register. These are some of the requirements which are fully met by the ferreed shift register of FIG. 7. For example, one notable advantage of such a ferreed shift register is that it remains in its remanent state without the necessity for providing any holding power. Relatively instantaneous parallel readout is provided in the register of FIG. 7 through the use of output source 97, resistor R7, output contacts $72b_0$–$72b_N$ and utilization circuit 107. Moreover, it will be noted that the responsive steering contact of any stage excepting stage N shunts the reset winding of the succeeding stage and allows for the proper registration of the desired binary digit by correspondingly appropriate steering characteristics. This operation will be further described infra.

The elements of each of the stages of FIG. 7 have been numbered in accordance with the system used with respect to each of the prior FIGS. 1–6; the only slight departure is represented by the designations $76_0$–$76_N$ for those respective bypassing conductors. The resistors $78_0$–$78_N$ serve, as did resistor 18 in FIG. 1, to prevent placing a "dead short" across the corresponding one of reset windings $75_0$–$75_N$ when switch 100 and contacts $72a_0$–$72a_{N-1}$ (N may illustratively equal 3, as in FIG. 7) respectively are closed.

*Filling the shift register of FIG. 7.*—Two symbolic manual switches numbered 100 and 110 are shown in connection with the shift register of FIG. 7. Switch 110 provides a readily accessible arrangement for filling each stage of the register with the same binary digit. For example, if it is assumed (as it will be hereinbelow) that a stage in the set state with its responsive contacts closed represents a binary "1," then the closing of switch 110 followed by an initializing signal from input pulse source 87 will allow such a signal to immediately pass to ground after having passed through all of the upper windings of the register stages. In accordance with the principles of ferreed switching, such pulse transmission is effective to set each stage of the register, thereby providing a binary 1 to each stage. The switch 110, which is open prior to the commencement of the shifting process, may be replaced by suitably responsive switching means in a manner which will be apparent to those skilled in the art.

*Shifting digits into the register of FIG. 7.*—Switch 100, also shown as a manual control, governs the shifting-in of all the binary digits. If it is assumed that a binary "0" is stored in stage 0, with all other stages having a binary "1" stored therein, thereby leaving steering contact $72a_0$ open, a binary 1 is shifted into the register of FIG. 7 by initially closing switch 100 and then pulsing the register from input pulse source 87. Such a pulse traverses an electrical path which includes the upper windings of all ferreeds, terminal $70_N$, over conductor $76_N$ and thence through closed contacts $72a_2$ and $72a_1$, conductor $76_1$, reset winding $75_1$, resistor $78_1$, terminal $70_0$, conductor $76_0$, and closed switch 100 to grounded terminal 77. This pulse transmission can be seen to reset stage 1 due to the differential excitation of its ferrite switching leg $72_1$ (reset winding $75_0$–$75_N$ have more turns than their corresponding set windings $74_0$–$74_N$), and to set stage 0 of the register due to the by-passing of its reset winding $75_0$. A binary 1 has thus been shifted into the lowest stage (stage 0) and the binary 0 that priorly existed in stage 0 has been shifted along to stage 1. Similarly, a binary 0 may be shifted into the register (assumed now to be filled with binary 1's) by providing a pulse from source 87 to the register with switch 100 in its unoperated or normal state as shown in FIG. 7. Such a pulse, it will readily be observed, will pass to ground at terminal 77 over the only available path thereto from terminal $70_0$, namely the path which includes reset winding $75_0$ and the resistor $78_0$; stage 0 will thereby be reset and when its responsive contacts $72a_0$ and $72b_0$ respond thereto, the binary 0 will have been completely shifted into the register of FIG. 7.

It will be further noted that in accordance with a unique feature of this invention, the "shunting" contacts $72a_0$–$72a_{N-1}$ (where N is assumed to be 3, stage (N−1) is, of course, stage 2) provide proper steering for shift pulses by holding their operated or released positions until the pulses have been properly steered to the appropriate ferreed windings.

*Shifting an illustrative number into the register of FIG. 7.*—Let it be assumed by way of example that the shift register of FIG. 7 has been completely filled with binary 1's by the prior operation of symbolic switch 110 followed by an initializing pulse from source 87 and that the switch 110 has now been released. The binary number which is now in the register is 1111 (decimal 15). Binary numbers in this description will read from left to right as they are associated with stages N down through 0 respectively; that is, if the binary number 1000 (decimal 8) were in the register, stage N of FIG. 7 (if it be assumed that $N=3$) would be the only stage exhibiting a stored binary 1 by being in the set state. All other stages would be reset and would thereby show or record a binary 0 therein. To proceed with the shifting process which commences with the aforementioned binary 1111 (decimal 15) in the register, and if it is desired to have the register store binary 1010 (decimal 10), a binary 0 is initially shifted into the register by providing a pulse from source 87 to the register with switch 100 open. Such a pulse leaves stages 1, 2 and N undisturbed, and resets stage 0, thereby opening its contacts $72a_0$ and $72b_0$, indicating the storage of a binary 0 in that stage.

This is followed by the shifting-in of a binary 1 by closing switch 100 and then providing a pulse from source 87 through the upper windings of all ferreeds, to terminal $70_N$ and over conductor $76_N$ through closed contacts $72a_2$ and $72a_1$, conductor $76_1$, terminal $70_1$, reset winding $75_1$, resistor $78_1$, terminal $70_0$, conductor $76_0$, and through closed switch 100 to grounded terminal 77. The effect of this pulse is to leave stages 2 and N undisturbed and to set stage 0 and reset stage 1. When the contacts of these two latter stages have operated and released respectively in response thereto, binary 1101 (decimal 13) is stored in the counter.

This particular example of shifting is completed by shifting-in another binary 0. To accomplish this, switch 100 is first opened and a pulse is then transmitted from source 87 through the upper windings of all ferreed stages to terminal $70_N$, from conductor $76_N$ through closed contact $72a_2$ over conductor $76_2$ to terminal $70_2$, through reset winding $75_2$ and resistor $78_2$ to terminal $70_1$ and thence over bypass conductor $76_1$ through closed contact $72a_0$ and finally across conductor $76_0$ to ground at terminal 77 from terminal $70_0$ through reset winding $75_0$ and resistor $78_0$. Such pulsing resets stages 0 and 2, sets stage 1, and leaves stage N undisturbed.

Therefore, when all responsive contacts have appropriately operated or released, stages 0 and 2 have a binary 0 stored therein, while stages 1 and N each exhibit a binary 1. The desired shifting process has thus been accomplished by the shifting-in of binary 010, thereby converting binary 1111 to binary 1010, and utilization circuit 107 can be made to be appropriately responsive to the closure condition of contacts $72b_1$ and $72b_N$ and similarly to the open condition of contacts $72b_0$ and $72b_2$, to indicate or read out in parallel to an external position that such a binary digit is stored in the register of FIG. 7.

It is to be understood that the above-described arrangements are illustrative of the application of the principles of the invention. Numerous other arrangements may be devised by those skilled in the art without departing from the spirit and scope of the invention.

What is claimed is:

1. A sequential circuit responsive to input pulses comprising a cascaded array of switching stages, each of said stages including remanent means, and a plurality of contact means responsive to changes in state of said remanent means for steering said pulses to selected ones of said stages; and output means including additional ones of said contact means in each of said stages for providing an external indication of the state of said remanent means.

2. A sequential circuit comprising a cascaded array of switching stages; a source of input pulses; each of said stages including first and second remanent magnetic means, said first remanent magnetic means being maintained in a first state, said second remanent magnetic means being transferable between said first state and a second state, and a plurality of contact means individual to each of said stages and responsive to changes in state of said second remanent magnetic means for sequentially propagating said pulses through said stages; and output means including additional ones of said contact means in each of said stages for providing an external indication of the state of said second remanent magnetic means.

3. A counter circuit responsive to input pulses comprising a plurality of coupled bistable devices, each of said devices including remanent means, and contact means for sequentially steering said pulses to selected ones of said devices and operative responsive to changes in state of said remanent means after said pulses have been steered to said selected ones of said devices; and means including additional ones of said contact means for providing an external indication of the state of said remanent means in each of said devices.

4. A binary counter comprising a source of input pulses; and a plurality of coupled bistable magnetic devices, each of said devices including first remanent magnetic means maintained in a first state, second remanent magnetic means transferable between said first state and a second state, contact means in each of said devices responsive to changes in state of said second remanent magnetic means for sequentially steering pulses from said source to said devices, and means including additional ones of said contact means for providing an external indication of the state of said second remanent magnetic means in each of said devices.

5. A binary counter responsive to input pulses to be counted comprising an array of serially cascaded bistable stages, each of said stages including first and second remanent magnetic means, a plurality of windings coupled to said remanent magnetic means and responsive to selected ones of said pulses for maintaining said first remanent magnetic means in a first state and for switching said second remanent magnetic means between said first state and a second state, a plurality of contact means responsive to changes in state of said second remanent magnetic means for selectively steering said pulses to said stages, impedance means for connecting each of said stages, and output means including additional ones of said contact means for indicating the state of said second remanent magnetic means of each of said stages.

6. A counter in accordance with claim 5 wherein each of said plurality of windings includes a first permanent set winding associated with said first remanent magnetic means, a reset winding associated with said second remanent magnetic means and responsive to said pulses for transferring said second remanent magnetic means to said second state, and a second set winding on said second remanent magnetic means and responsive to selected ones of said pulses steered thereto from said reset winding to transfer said second remanent magnetic means from said second state to said first state.

7. A binary counter in accordance with claim 6 wherein said second set winding includes a greater number of turns than said reset winding.

8. A binary counter responsive to a train of pulses comprising a plurality of bistable stages, each of said stages including first and second remanent magnetic means, a plurality of windings associated with said first and second remanent magnetic means and excited by selected ones of said pulses for maintaining said first remanent magnetic means in a first state and for transferring said second remanent magnetic means between said first state and a second state, a plurality of contact means responsive to changes in state of said second remanent magnetic means for steering selected ones of said pulses to selected ones of said windings in each of said stages and in succeeding ones of said stages, and output means for indicating the state of said second remanent magnetic means of each of said stages.

9. A counter in accordance with claim 8 wherein said output means includes an additional one of said contact means in each of said stages.

10. A counter in accordance with claim 8 wherein said plurality of windings includes a first set winding responsive to said pulses to maintain said first remanent magnetic means in said first state, a reset winding connected to said first set winding and responsive to selected ones of said pulses for changing the state of said second remanent magnetic means from said first state to said second state, and a second set winding excited by pulses steered thereto from said reset winding when said stage is in said second state.

11. A ring counter circuit including a plurality of serially connected bistable stages; a source of input pulses; each of said stages comprising first and second remanent magnetic means transferable between a first state and a second state, a plurality of winding means coupled to said remanent magnetic means including a reset winding connected by said contact means to said source of input pulses for switching said second remanent magnetic means from said first state to said second state, a first set winding coupled to said first remanent magnetic means and responsive to said pulses from said source for maintaining said first remanent magnetic means in said first state, and a second set winding on said second remanent magnetic means responsive to selected ones of said pulses steered thereto for changing the state of said second remanent magnetic means from said second state to said first state, and contact means responsive to changes in state of said second remanent magnetic means for gating said pulses to selected ones of said stages to change the condition of said selected stages; means for connecting said reset winding of each of said stages to said first and second set windings of the respective succeeding ones of said stages including means for connecting the last of said stages with the first of said stages; and output means including one of said contact means in each of said stages for indicating the state of said stages.

12. A ring counter circuit for counting input pulses comprising a cascaded array of bistable stages, each of said stages including first and second remanent magnetic means, winding means coupled to said remanent magnetic means including a first set winding responsive to said pulses for maintaining said first remanent magnetic means in a first state, a reset winding responsive to said pulses for transferring said second remanent magnetic means from said first state to a second state, and a second set winding responsive to selected ones of said pulses steered thereto from said reset winding via said contact means for switching said remanent magnetic means from said second state to said first state, a plurality of contact means responsive to changes in state of said second remanent magnetic means for steering selected ones of said pulses to the succeeding one of said stages, and output means including one of said contact means for providing an external indication of the state of said stages; and gross reset means for serially connecting said reset winding of each of said stages to said first set winding of the respective succeeding ones of said stages.

13. A circuit in accordance with claim 12 including in addition means for initially switching said second remanent magnetic means of a selected one of said stages to said first state and for interconnecting the last of said stages with the first of said stages.

14. A ring counter for propagating a fixed condition through a cascaded array of bistable stages in response to input signals, each of said stages comprising first and second remanent magnetic means, a plurality of winding means coupled to said remanent magnetic means and responsive to said signals for maintaining said first remanent magnetic means in a first state and for switching said second remanent magnetic means between said first state and a second state, and contact means operative responsive to changes in state of said second remanent magnetic means for steering said signals to one of said winding means of the succeeding one of said stages prior to the operation of said contact means.

15. A counter circuit comprising a source of input pulses; and a plurality of bistable stages, each of said stages including first and second remanent magnetic elements, first set winding means responsive to said pulses from said source for establishing said first remanent magnetic element in a first state, reset winding means responsive to said pulses for establishing said second remanent magnetic means in a second state, second set winding means responsive to selected ones of said pulses for transferring said second remanent magnetic means to said first state, and contact means for providing a steering path for said selected ones of said pulses to said second set winding means of the succeeding one of said stages and operative in response to the establishment of said second remanent magnetic means in said second state for interrupting said steering path after said selected ones of said pulses have been provided to said second set winding means of said succeeding stage.

16. A sequential circuit comprising a plurality of stages of magnetically controlled switching devices, each of said devices including remanent magnetic means, winding means for changing the remanent state of said remanent magnetic means, and contact means operative in response to changes in said remanent state; a source of input pulses; means for steering said input pulses to a selected one of said stages, said steering means including said contact means in each of said stages magnetically coupled to the device of the stage immediately preceding said selected stage and operative after said pulses have been steered to said selected stage; and output means comprising an additional one of said contact means in each of said stages for providing an external indication of the state of said stages.

17. A ring counter circuit responsive to input pulses comprising a plurality of magnetically controlled switching stages, each of said stages including first and second remanent magnetic members, and contact means for steering said pulses to a particular one of said stages and operative responsive to changes in state of one of said members of the stage immediately preceding said particular stage only after said pulses have been steered to said particular one of said stages.

18. A ring counter circuit comprising a source of input pulses; a plurality of ferreed stages, each of said stages including remanent magnetic means, and first and second contact means responsive to changes in state of said remanent magnetic means after an inherent time delay; steering means for transmitting said pulses to a particular one of said stages, said steering means including said first contact means in each of said stages magnetically coupled to the one of said stages immediately preceding said particular stage; and output means including said second contact means for providing an external indication of the states of said stages.

19. A sequential circuit for registering coded information in response to input pulses comprising a cascaded array of bistable stages, each of said stages including remanent means, a plurality of windings responsive to selected ones of said pulses for changing the state of said remanent means, and a plurality of contact means responsive to changes in state of said remanent means for shunting selected ones of said windings; and output means including one of said contact means in each of said stages for providing an external indication of the state of said stages.

20. A shift register comprising a source of input pulses; a plurality of magnetically controlled switching stages, each of said stages including first and second remanent magnetic means, first set winding means responsive to said pulses for maintaining said first remanent magnetic means in a first state, second set winding means responsive to said pulses for establishing said second remanent magnetic means in a first state, reset winding means responsive to selected ones of said pulses for transferring said second remanent magnetic means from said first state to a second state, and a plurality of contact means for shunting said reset winding means in an adjacent one of said stages and responsive to changes in state of said second remanent magnetic means for steering said selected ones of said pulses to respective selected ones of said reset winding means; and output means including one of said contact means for providing an external indication of the state of said stages.

21. A register in accordance with claim 20 including in addition means for serially connecting said second set winding means of each of said stages to said first set winding means of the succeeding ones of said stages.

22. A register in accordance with claim 20 including in addition first switching means for establishing said second remanent magnetic means in each of said stages in said first state in response to one of said pulses, and second switching means for sequentially controlling the state of said second remanent magnetic means of each of said stages in response to a series of said pulses.

23. A shift register responsive to data represented by a sequence of input signals comprising a plurality of bistable stages, each of said stages including first and second remanent magnetic members, first winding means responsive to said signals for maintaining said first remanent magnetic means in a first state, second winding means responsive to said signals for establishing said second remanent magnetic means in said first state, third winding means responsive to selected ones of said signals for switching said second remanent magnetic means from said first state to a second state, and contact means responsive to changes in state of said second remanent magnetic means for steering said selected ones of said pulses to said third winding means; shunting means including said contact means magnetically coupled to the preceding one of said stages for bypassing said third winding means; and means including an additional one of said contact means from each of said stages for reading out said data stored in said stages.

24. A shift register responsive to input pulses comprising a cascaded array of bistable stages, each of said stages including first and second remanent magnetic means, a plurality of windings responsive to selected ones of said pulses for maintaining said first remanent magnetic means in a first state and for transferring said second remanent magnetic means between said first state and a second state, and contact means responsive to changes in state of said second remanent magnetic means for steering selected ones of said pulses to particular ones of said stages and operative after said pulses have been steered to said particular stages.

25. A binary cell responsive to input signals comprising first and second remanent magnetic means, winding means coupled to said remanent magnetic means and responsive to said signals for maintaining said first remanent magnetic means in a first state and for transferring said second remanent magnetic means between said first state and a second state, contact means responsive to changes in state of said second remanent magnetic means for steering said signals to selected ones of said winding means, and output means for externally indicating the state of said cell.

26. A cell in accordance with claim 25 wherein said output means includes one of said contact means.

27. A ferreed binary cell comprising a source of input pulses, a first remanent magnetic element and a second remanent magnetic element, a first set winding responsive to said pulses for maintaining said first remanent magnetic element in a first state, a second set winding responsive to selected ones of said pulses for establishing said second remanent magnetic element in said first state, a reset winding responsive to selected ones of said pulses for establishing said second remanent magnetic element in a second state, contact means responsive to changes in state of said second remanent magnetic element after said pulses have been selectively steered to said second set winding and said reset winding for steering subsequent ones of said pulses over a path including said first set winding, said second set winding and said reset winding, and output means including an additional one of said contact means for providing an external indication of the state of said second remanent magnetic element of said cell.

28. A binary cell in accordance with claim 27 wherein said reset winding and said second set winding each include unequal numbers of turns.

29. A binary cell responsive to input pulses comprising remanent means, a plurality of winding means excitable by selected ones of said pulses for switching the state of said remanent means, a plurality of contact means for steering said pulses to particular ones of said windings and operative responsive to changes in state of said remanent means after said pulses have been steered to said particular ones of said windings, and output means including one of said contact means for indicating the state of said remanent means.

30. A ferreed binary cell comprising a source of input pulses, first and second remanent magnetic means, first set winding means responsive to said pulses for establishing said first remanent magnetic means in a first state, second set winding means including a predetermined number of turns and responsive to selected ones of said pulses for switching said second remanent magnetic means from a second state to said first state, reset winding means including a relatively lower number of turns and responsive to selcted ones of said pulses for switching said second remanent magnetic means from said first state to said second state and a plurality of contact means including first contact means operative in response to changes in state of said second remanent magnetic means from said second state to said first state for shunting said second set winding; and output means including a second of said contact means for providing an external indication of the state of said second remanent magnetic means.

31. A ferreed binary cell responsive to input pulses comprising first and second remanent magnetic means, a first set winding responsive to said pulses for establishing said first remanent magnetic means in a first state, a second set winding responsive to selected ones of said pulses for switching said second remanent magnetic means from a second state to said first state, a reset winding responsive to selected ones of said pulses for switching said second remanent magnetic means from said first state to said second state, first contact means operative in response to changes in state of said second remanent magnetic means from said second state to said first state to shunt said first set winding and said second set winding, and output means including second contact means responsive to the switching of said second remanent magnetic means to provide an indication of the state of said second remanent magnetic means.

32. A sequential circuit responsive to input pulses comprising a plurality of connected switching stages, each of said stages including remanent magnetic means, and a plurality of winding means for changing the state of said remanent magnetic means in response to selected ones of said pulses steered to said winding means; and means for electrically isolating said winding means in said stages to prevent the passage of spurious signals to said stages intermediate said pulses, said isolating means including contact means responsive to changes in state of said remanent magnetic means in each of said stages and operative after said selcted ones of said pulses have been steered to said winding means.

References Cited by the Examiner

UNITED STATES PATENTS

| | | | |
|---|---|---|---|
| 3,017,542 | 1/1962 | Pearce | 317—140 |
| 3,023,401 | 2/1962 | Loev | 340—174 |
| 3,042,900 | 7/1962 | Werts | 340—168 |
| 3,043,990 | 7/1962 | Lillquist | 317—123 |
| 3,056,906 | 10/1962 | Peters | 317—123 |
| 3,076,918 | 2/1963 | Hinkle et al. | 317—140 |

NEIL C. READ, *Primary Examiner.*

P. XIARHOS, D. YUSKO, *Assistant Examiners.*